(12) United States Patent
Shi et al.

(10) Patent No.: US 11,378,519 B2
(45) Date of Patent: Jul. 5, 2022

(54) FLUORESCENT TEST PAPER FOR DETECTING MERCURY IONS AND DETECTION METHOD USING THE SAME

(71) Applicant: Jiangsu University, Jiangsu (CN)

(72) Inventors: Jiyong Shi, Jiangsu (CN); Wenting Li, Jiangsu (CN); Xiaobo Zou, Jiangsu (CN); Zhihua Li, Jiangsu (CN); Xiaowei Huang, Jiangsu (CN); Zhiming Guo, Jiangsu (CN); Xuetao Hu, Jiangsu (CN); Nini Liang, Jiangsu (CN); Yongqiang Shi, Jiangsu (CN); Haijun Shi, Jiangsu (CN); Xueping Cui, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 17/053,070

(22) PCT Filed: Sep. 26, 2019

(86) PCT No.: PCT/CN2019/107980
§ 371 (c)(1),
(2) Date: Nov. 5, 2020

(87) PCT Pub. No.: WO2021/035855
PCT Pub. Date: Mar. 4, 2021

(65) Prior Publication Data
US 2021/0278345 A1    Sep. 9, 2021

(30) Foreign Application Priority Data
Aug. 26, 2019 (CN) .......................... 201910789122.6

(51) Int. Cl.
*G01N 21/77* (2006.01)

(52) U.S. Cl.
CPC ..... *G01N 21/77* (2013.01); *G01N 2021/7759* (2013.01); *G01N 2021/7786* (2013.01)

(58) Field of Classification Search
None
See application file for complete search history.

(56) References Cited

U.S. PATENT DOCUMENTS 5,225,128 A * 7/1993 Katsuragawa ............ B28B 3/26
                                                         264/79

FOREIGN PATENT DOCUMENTS

| CN | 104655599 | 5/2015 |
|---|---|---|
| CN | 106053792 | 10/2016 |

(Continued)

OTHER PUBLICATIONS

Zhou et al., Color-Multiplexing-Based Fluorescent Test Paper: Dosage-Sensitive Visualization of Arsenic(III) with Discernable Scale as Low as 5 ppb, 2016, ACS Publications, 88, 6105-6109. (Year: 2016).*

(Continued)

*Primary Examiner* — Lore R Jarrett
(74) *Attorney, Agent, or Firm* — JCIP Global Inc.

(57) ABSTRACT

Fluorescent test paper for detecting mercury ions is firstly prepared, the fluorescent test paper including a fluorescence development area and a standard fluorescent colorimetric card. With reference to an excited color corresponding to a reference channel in the standard colorimetric card, the color corresponding to a carbon quantum dots distribution area on the fluorescent test paper is observed to check the fluorescence detection environment during detection with the fluorescent test paper. In colorimetric detection of the content of mercury ions, the concentration of $Hg^{2+}$ is detected based on an excited color, in the standard colorimetric card, that corresponds to a standard mercury ion sample and is closest (Continued)

to a color signal in a copper nanoclusters distribution area on the fluorescent test paper.

3 Claims, 2 Drawing Sheets

(56) References Cited

FOREIGN PATENT DOCUMENTS

| | | |
|---|---|---|
| CN | 107345910 | 11/2017 |
| CN | 107796806 | 3/2018 |
| CN | 207147977 | 3/2018 |
| CN | 108489951 | 9/2018 |
| CN | 109164083 | 1/2019 |
| CN | 109490269 | 3/2019 |
| CN | 110108701 | 8/2019 |
| WO | 2015020281 | 2/2015 |

OTHER PUBLICATIONS

Feng et al., Dual-modal light scattering and fluorometric detection of lead ion by stimuli-responsive aggregation of BSA-stabilized copper nanoclusters, 2016, RSC Adv., 6, 96729-96734. (Year: 2016).*

Yu et al., Multicolorful fluorescent-nanoprobe composed of Au nanocluster and carbon dots for colorimetric and fluorescent sensing $Hg^{2+}$ and $Cr^{6+}$, Feb. 8, 2018, Sensors and Actuators B 262, 678-686. (Year: 2018).*

"International Search Report (Form PCT/ISA/210) of PCT/CN2019/107980," dated May 26, 2020, pp. 1-5.

Liu Jinghan, "Synthesis of Ratiometric Fluorescence Probe and Application in Detection of Mercury Ion", Food Science and Engineering, Northwest A&F University, May 2019, pp. 1-60.

* cited by examiner

US 11,378,519 B2

FLUORESCENT TEST PAPER FOR DETECTING MERCURY IONS AND DETECTION METHOD USING THE SAME

CROSS-REFERENCE TO RELATED APPLICATION

This application is a 371 of international application of PCT application serial no. PCT/CN2019/107980, filed on Sep. 26, 2019, which claims the priority benefit of China application no. 201910789122.6, filed on Aug. 26, 2019. The entirety of each of the above mentioned patent applications is hereby incorporated by reference herein and made a part of this specification.

TECHNICAL FIELD

The present invention relates to the technical field of food safety inspection, and in particular, to a fluorescent test paper for detecting mercury ions and a detection method using the same.

BACKGROUND

As a hypertoxic heavy metal, mercury passes along the food chain and is slowly metabolized in the human body, which may easily cause cumulative intoxication and affect the function of brain cells. At present, detection methods for mercury ions ($Hg^{2+}$) mainly include atomic absorption spectrometry (AAS), inductively coupled plasma mass spectrometry (ICP-MS), electrochemical methods and the like. Although these methods achieve high detection sensitivity and accurate results, they have cumbersome detection process, complicated operation, high cost of instruments and equipments, and the need for performing under laboratory conditions, therefore, they may be difficult to meet the demands of rapid field detection and routine detection. Given the hazards caused by mercury ions to the human body and the defects of the existing detection methods, it is of great practical significance to develop a method for rapidly and conveniently detecting the content of mercury ions in foods.

In recent years, the existing methods for detecting mercury ions by using fluorescent probes have the following defects: 1. The nanomaterials used are relatively expensive and cumbersome to synthesize; 2. Special instruments are required to obtain fluorescent signals from the response channel and the reference channel, so the hardware cost is high and the operation is complicated.

SUMMARY

To overcome one of the defects of the existing methods, the present invention provides a fluorescent test paper for detecting mercury ions in foods based on copper nanoclusters (CuNCs)-carbon quantum dots (CQDs) and a detection method using the same, to achieve low-cost and rapid detection of mercury ions in foods.

To fulfill the above objective of the invention, the present invention adopts the following technical solutions.

The present invention firstly provides a fluorescent test paper for detecting mercury ions, the fluorescent test paper including a fluorescence development area, the fluorescence development area including a carbon quantum dots distribution area and a copper nanoclusters distribution area, wherein the carbon quantum dots distribution area is impregnated with carbon quantum dots fluorescent probes for checking environment; and the copper nanoclusters distribution area is impregnated with copper nanoclusters fluorescent probes for detecting a concentration of the mercury ions.

The carbon quantum dots distribution area and the copper nanoclusters distribution area are at an area ratio of 1:1.

The fluorescent test paper further includes a test paper handheld area.

The test paper handheld area, the carbon quantum dots distribution area, and the copper nanoclusters distribution area are separated by a T-shaped boundary line.

Moreover, the fluorescent test paper further includes a standard fluorescent colorimetric card, the standard fluorescent colorimetric card including a reference channel area, and the reference channel area including a reference channel excitation wavelength printing area and a reference channel-related excited color printing area. The standard fluorescent colorimetric card further includes a standard mercury ion sample concentration area, the standard mercury ion sample concentration area including a standard mercury ion sample concentration identification area, a standard mercury ion sample-related excited color identification area, and a standard mercury ion concentration unit identification area.

In addition, the standard mercury ion sample concentration identification area includes a plurality of standard mercury ion sample concentration printing units; and the standard mercury ion sample-related excited color identification area includes a plurality of standard mercury ion sample-related excited color printing units.

The fluorescence development area and the standard fluorescent colorimetric card are arranged on the same test paper or arranged separately.

The fluorescent test paper includes a plurality of development areas.

The present invention further provides a method for preparing a fluorescent test paper for detecting mercury ions, the method including the following steps:

preparing the fluorescent test paper: forming a carbon quantum dots distribution area and a copper nanoclusters distribution area on a blank test paper, carbon quantum dots fluorescent probes for checking environment being distributed in the carbon quantum dots distribution area, and copper nanoclusters fluorescent probes for detecting a concentration of the mercury ions being distributed in the copper nanoclusters distribution area;

obtaining a standard color corresponding to a response channel/reference channel: preparing a plurality of standard $Hg^{2+}$ samples with different $Hg^{2+}$ concentrations; immersing the fluorescent test paper in each of the standard $Hg^{2+}$ samples for a few minutes before taking it out, to obtain a plurality of the reacted test papers; individually capturing RGB images of the reacted test papers in illumination condition of a preset light source; extracting color signals corresponding to the carbon quantum dots distribution area in the RGB images, and calculating and recording an average value of the color signals as the standard color corresponding to the reference channel; and extracting color signals corresponding to the copper nanoclusters distribution area in the RGB images, to obtain the standard colors of the response channel corresponding to the standard $Hg^{2+}$ samples with different $Hg^{2+}$ concentrations; printing in a standard fluorescent colorimetric card area: printing, in the standard fluorescent colorimetric card area, the illumination condition of the preset light source, the standard color corresponding to the reference channel, the plurality of $Hg^{2+}$ concentrations corresponding to the standard $Hg^{2+}$ samples, standard mercury ion concentration unit, and the standard colors of the response channel corresponding to the standard $Hg^{2+}$ samples.

Specifically, the printing is performed by the following steps:

printing the illumination condition "excitation wavelength $W_1$ nm" of the preset light source in a reference channel excitation wavelength printing area, and printing a standard color $C_{-CQDs}$ corresponding to the reference channel in a reference channel-related excited color printing area; sequentially printing $Hg^{2+}$ concentrations corresponding to n standard $Hg^{2+}$ samples $S_1, S_2, \ldots, S_{n-1}, S_n$ in corresponding standard mercury ion sample concentration printing units in a standard mercury ion sample concentration identification area, and printing the standard mercury ion concentration unit in a standard mercury ion concentration unit identification area; and sequentially printing standard colors $C_{-CuNCs-1}, C_{-CuNCs-2}, \ldots, C_{-CuNCs-n-1}, C_{-CuNCs-n}$ of the response channel corresponding to the n standard $Hg^{2+}$ samples $S_1, S_2, \ldots, S_{n-1}, S_n$ in corresponding standard mercury ion sample-related excited color printing units in a standard mercury ion sample-related excited color identification area, wherein n>0 and is a positive integer; $W_1$ is a specific excitation wavelength, $W_1$>0 and is a positive integer, and preferably, the $W_1$ nm is 365 nm.

The present invention further provides a method for detecting mercury ions, the method including the following steps:

reaction of a fluorescent test paper: immersing the fluorescent test paper in a solution to be detected for a few minutes before taking it out, and placing it on a clean glass plate for natural air drying, to obtain the reacted test paper PP corresponding to the solution to be detected;

check of a fluorescence detection environment: placing the reacted test paper PP under a light source with a wavelength of $W_1$ nm to observe color $C_{-CQDs'}$ corresponding to a carbon quantum dots distribution area (3); and if the $C_{-CQDs'}$ differs from color $C_{-CQDs}$ in a reference channel-related excited color printing area (7) of a standard colorimetric card, checking luminous intensity of the light source and adjusting a distance between the reacted test paper PP and the light source to make the color $C_{-CQDs'}$ identical to the $C_{-CQDs}$; preferably, $W_1$ nm being 365 nm;

colorimetric reading of a content of mercury ions: observing color signal $C_{-CuNCs'}$ corresponding to a copper nanoclusters distribution area (4) of the reacted test paper PP in the checked fluorescence detection environment, and finding, in a standard mercury ion sample-related excited color identification area (10) of the standard fluorescent colorimetric card, a standard mercury ion sample-related excited color printing unit (11) in which color is closest to the color signal $C_{-CuNCs'}$, so that figures in a standard mercury ion sample concentration printing unit (9) above the standard mercury ion sample-related excited color printing unit (11) indicate the concentration of $Hg^{2+}$.

The present invention has the following beneficial effects.

In the solution of the present invention, with reference to the excited color corresponding to the reference channel in the standard colorimetric card, the color corresponding to the carbon quantum dots distribution area is observed to check the fluorescence detection environment during detection with the fluorescent test paper, which can reduce the difference of the fluorescence detection environment during detection with the fluorescent test paper and detection based on the standard colors of the response channel of the standard mercury ion samples, thereby reducing the influence of the difference of the fluorescence detection environment on colorimetric detection of mercury ions with the fluorescent test paper.

Mercury ion detection methods based on ratio-type fluorescent probes are highlighted due to high detection accuracy, strong capability of resisting environmental interference and the like. The ratio-type fluorescent probe has dual-emission fluorescent signal channels (a response channel and a reference channel), wherein the signal strength of the response channel is related to the concentration of an object to be detected; while the signal strength of the reference channel is unrelated to the concentration of the object to be detected and is merely related to the environmental factor that influences the fluorescent signal strength of the object to be detected. The correction function of the reference channel can effectively reduce the interference caused by the environmental factor to the detection results, thereby obtaining detection results that are more accurate than those of a single-channel fluorescent probe (single-emission fluorescent probe).

Figure 1:
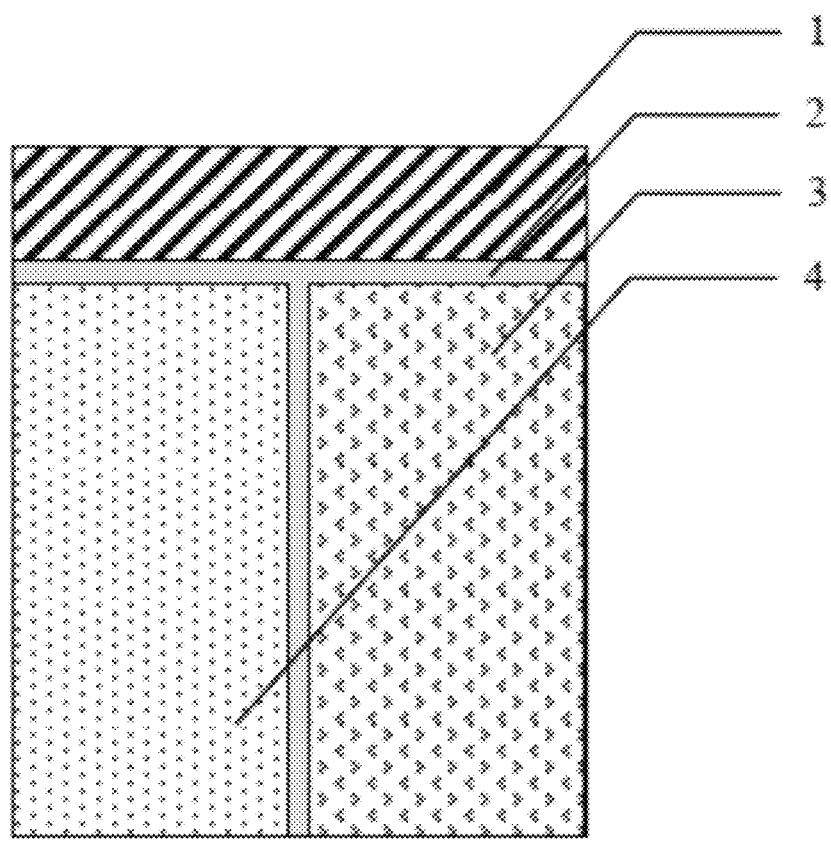
FIG. 1 is a schematic structural view of a preferred example of a fluorescent test paper for detecting mercury ions according to the present invention.
Figure 2:
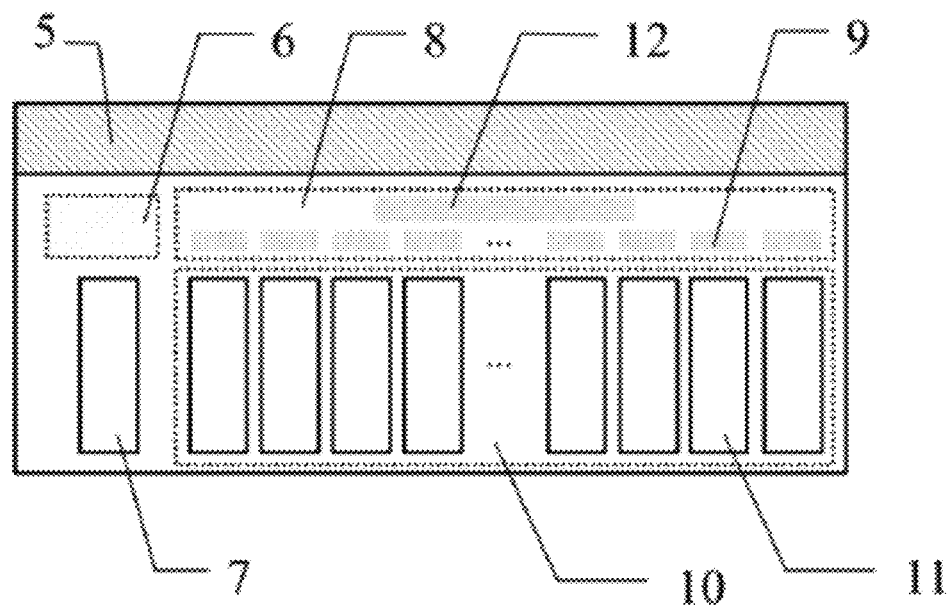
FIG. 2 is a schematic structural view of a standard fluorescent colorimetric card of the fluorescent test paper shown in FIG. 1.
Figure 3:
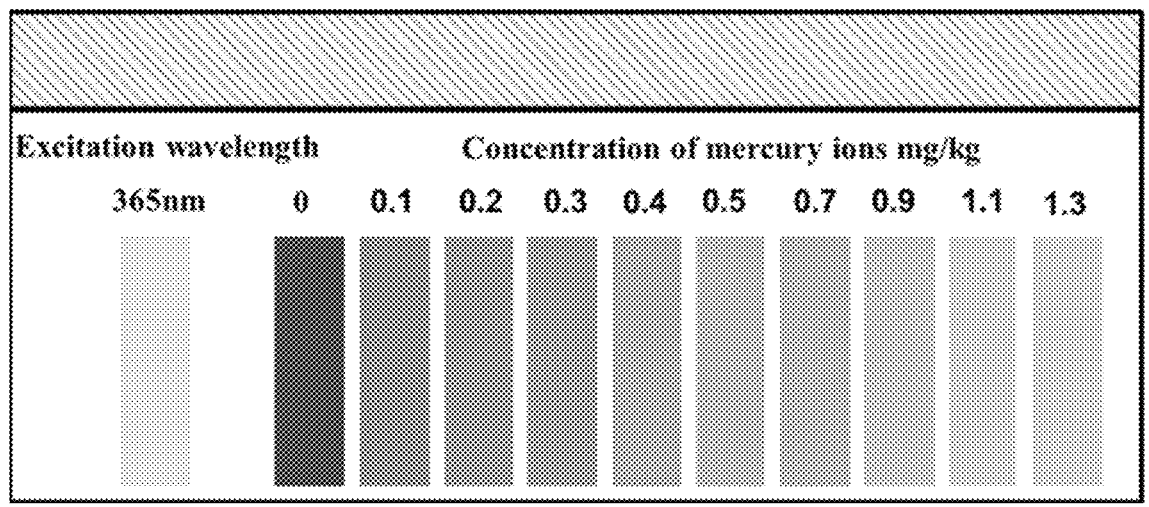
FIG. 3 shows the standard fluorescent colorimetric card prepared in the example.

In the drawings, 1. test paper handheld area, 2. T-shaped boundary line, 3. carbon quantum dots distribution area, 4. copper nanoclusters distribution area; 5. colorimetric card handheld area, 6. reference channel excitation wavelength printing area, 7. reference channel-related excited color printing area, 8. standard mercury ion sample concentration identification area, 9. standard mercury ion sample concentration printing unit, 10. standard mercury ion sample-related excited color identification area, 11. standard mercury ion sample-related excited color printing unit, 12. standard mercury ion concentration unit identification area.

DETAILED DESCRIPTION OF THE EMBODIMENTS

The present invention will be described in detail below through embodiments. These examples are merely for illustration, instead of limiting the scope of the present invention. Moreover, after reading the content of the present invention, persons skilled in the art can make variations or modifications to the present invention, and these equivalent forms shall fall within the scope limited by the appended claims of the present application.

Example 1: A Fluorescent Test Paper for Detecting Mercury Ions and Preparation Method Thereof Step 1: The preparation of the fluorescent test paper includes preparation of a blank test paper, preparation of fluorescent probes, and impregnation of the fluorescent probes.

Step 1.1: Preparation of a blank test paper: a blank neutral filter paper (non-fluorescent) of a size of 3×4 cm is taken, where the filter paper includes a fluorescence development area, and the fluorescence development area includes a carbon quantum dots distribution area 3 and a copper nanoclusters distribution area 4. The carbon quantum dots distribution area 3 is impregnated with carbon quantum dots fluorescent probes for checking the environment, and the copper nanoclusters distribution area 4 is impregnated with copper nanoclusters fluorescent probes for detecting the concentration of mercury ions.

The test paper includes a handheld area 1, a T-shaped boundary line 2, the carbon quantum dots distribution area 3, and the copper nanoclusters distribution area 4. The handheld area 1, the carbon quantum dots distribution area 3 and the copper nanoclusters distribution area 4 are separated by the T-shaped boundary line 2. The area ratio of the carbon quantum dots distribution area to the copper nanoclusters distribution area is 1:1.

Step 1.2: Preparation of fluorescent probes, including preparation of the carbon quantum dots fluorescent probes and preparation of the copper nanoclusters fluorescent probes.

A method for preparing the carbon quantum dots fluorescent probes includes the following steps. 1 mL of an aqueous sucrose solution with a mass fraction of 30%, 0.2 mL of concentrated sulfuric acid with a mass fraction of 98%, and 6 mL of polyethylene glycol with a molecular weight of 200 are mixed and stirred, then heated for 15 s in a microwave oven to obtain a carbon quantum dots solution, and the carbon quantum dots solution is purified through dialysis in deionized water by using a dialysis bag (1000 D) for 24 h, to obtain the carbon quantum dots fluorescent probes that have an excitation wavelength of 365 nm and an emission wavelength of 550 nm and have no fluorescence response to mercury ions.

A method for preparing the copper nanoclusters fluorescent probes includes the following steps. 32 mg of $CuSO_4$ is added into 20 g of water, then 2 mL of a NaOH solution (0.5 M) and 20 mL of an ascorbic acid solution (0.1 M) are added, the pH value is adjusted to 8.0-9.0, water-bathing while stirring at a temperature of 50° C. is performed for 15 h to obtain a copper nanoclusters stock solution, and the copper nanoclusters stock solution is purified through dialysis in deionized water by using a dialysis bag (1000 D) for 24 h, to obtain the copper nanoclusters fluorescent probes that have an excitation wavelength of 365 nm and an emission wavelength of 445 nm and have fluorescence response to mercury ions.

Step 1.3: Impregnation of the fluorescent probes: the carbon quantum dots distribution area 3 on the blank test paper prepared in Step 1.1 is immersed into the carbon quantum dots fluorescent probe solution prepared in Step 1.2 for 10 min before taking it out. The copper nanoclusters distribution area 4 on the blank test paper prepared in Step 1.1 is immersed into the copper nanoclusters fluorescent probe solution prepared in Step 1.2 for 10 min before taking it out, and then, the blank test paper impregnated with the fluorescent probes is placed on a clean glass plate for natural air drying, to obtain fluorescent test paper P.

Step 2: Preparation of a standard fluorescent colorimetric card, including design of a colorimetric card, obtaining of a standard color corresponding to a response channel/reference channel, and printing of a standard fluorescent colorimetric card.

Step 2.1: Design of the colorimetric card: the colorimetric card includes a colorimetric card handheld area 5, a reference channel area, and a standard mercury ion sample concentration area. The reference channel area includes a reference channel excitation wavelength printing area 6 and a reference channel-related excited color printing area 7. The standard mercury ion sample concentration area includes a standard mercury ion sample concentration identification area 8, a standard mercury ion sample-related excited color identification area 10, and a standard mercury ion concentration unit identification area 12. The standard mercury ion sample concentration identification area 8 includes 10 standard mercury ion sample concentration printing units 9. The standard mercury ion sample-related excited color identification area 10 includes 10 standard mercury ion sample-related excited color printing units 11. The color in each of the standard mercury ion sample-related excited color printing units 11 and the figures in each of the standard mercury ion sample concentration printing units 9 respectively correspond to the excited color and the concentration of mercury ions of the same standard mercury ion sample.

Step 2.2: A method for obtaining the standard color corresponding to the response channel/reference channel includes the following steps:

(1) 10 standard $Hg^{2+}$ solutions $S_1, S_2, \ldots, S_9, S_{10}$ are prepared, with the concentration gradients $Q_1, Q_2, \ldots, Q_9, Q_{10}$ thereof being respectively 0, 0.1, 0.2, 0.3, 0.4, 0.5, 0.7, 0.9, 1.1, and 1.3 mg/kg;

(2) 10 fluorescent test papers $P_1, P_2, \ldots, P_9, P_{10}$ prepared in Step 1 are respectively immersed into the standard $Hg^{2+}$ solutions $S_1, S_2, \ldots, S_9, S_{10}$ for 10 min before taking them out, and then, the test papers are placed on a clean glass plate for natural air drying, to obtain 10 test papers $P'_1, P'_2, \ldots, P'_9, P'_{10}$ that have reacted with the standard $Hg^{2+}$ solutions;

(3) RGB images $I_1, I_2, \ldots, I_9, I_{10}$ of the 10 reacted test papers $P'_1, P'_2, \ldots, P'_9, P'_{10}$ in the illumination condition of a light source of 365 nm are captured with a camera;

(4) RGB signals [235 242 20], [229 238 18], [236 236 14], [230 245 15], [233 240 18], [232 235 20], [238 234 16], [237 238 15], [239 243 19], and [230 239 16] corresponding to the carbon quantum dots distribution area 3 on the images $I_1, I_2, \ldots, I_9, I_{10}$ of the 10 reacted test papers are extracted, to obtain and record an average value of the above color values as a standard color [234 239 17] corresponding to the reference channel; and RGB signals corresponding to the copper nanoclusters distribution area 4 on the images $I_1, I_2, \ldots, I_9, I_{10}$ of the 10 reacted test papers are extracted, to obtain standard colors [21 87 242], [123 160 255], [76 158 235], [55 176 228], [85 197 226], [111 201 236], [129 226 214], [113 220 185], [109 209 134], and [211 218 73] of the response channel corresponding to the concentrations 0, 0.1, 0.2, 0.3, 0.4, 0.5, 0.7, 0.9, 1.1, and 1.3 mg/kg of the 10 standard $Hg^{2+}$ solutions.

Step 2.3: Preparation and printing of the standard fluorescent colorimetric card, including the following steps: Characters "excitation wavelength 365 nm" are printed in the reference channel excitation wavelength printing area 6 with a color printer. The standard color RGB=[234 239 17] corresponding to the reference channel is printed in the reference channel-related excited color printing area 7. The $Hg^{2+}$ concentrations 0, 0.1, 0.2, 0.3, 0.4, 0.5, 0.7, 0.9, 1.1, and 1.3 mg/kg corresponding to the 10 standard $Hg^{2+}$ samples $S_1, S_2, \ldots, S_{n-1}, S_n$ are sequentially printed in the 10 standard mercury ion sample concentration printing units 9 in the standard mercury ion sample concentration identification area 8 from left to right. The standard mercury ion concentration unit "concentration of mercury ions mg/kg" is printed in the standard mercury ion concentration unit identification area 12. The standard colors RGB=[21 87 242], [123 160 255], [76 158 235], [55 176 228], [85 197 226], [111 201 236], [129 226 214], [113 220 185], [109 209 134], and [211 218 73] of the response channel corresponding to the 10 standard $Hg^{2+}$ samples $S_1, S_2, \ldots, S_{n-1}, S_n$ are sequentially printed in the 10 standard $Hg^{2+}$ sample-related excited color printing units 11 in the standard mercury ion sample-related excited color identification area 10 from left to right.

The prepared fluorescent test paper includes the fluorescence development area, the fluorescence development area includes the carbon quantum dots distribution area 3 and the copper nanoclusters distribution area 4, and the fluorescent test paper further includes the test paper handheld area 1.

The fluorescent test paper further includes the standard fluorescent colorimetric card. The fluorescence development area and the standard fluorescent colorimetric card are arranged on the same test paper; or the fluorescence development area is arranged on the fluorescent test paper, and the standard fluorescent colorimetric card is arranged separately.

The fluorescent test paper includes a plurality of development areas.

Example 2: Detection of Mercury Ions

The colorimetric detection of $Hg^{2+}$ in foods includes reaction of a fluorescent test paper, check of the fluorescence detection environment, and colorimetric reading of the content of mercury ions.

Step 3.1: Reaction of the fluorescent test paper: Firstly, a crab sample (commercially available) is taken, followed by washing away dirt on the surface of the body of *Eriocheir sinensis*, dissecting, and taking out hepatopancreas, gonads, and muscles which are thoroughly grinded and mixed before being frozen in a refrigerator. 1.0 g of the sample is putted into a teflon digestion tank, followed by adding 4 mL of nitric acid and then adding 2 mL of hydrogen peroxide, standing overnight, and putting the digestion tank in a microwave digestion instrument for digestion and acid expelling, to obtain a crab digestion solution. Standard $Hg^{2+}$ solutions of different concentrations (namely, 0.3, 0.5, and 0.8 mg/kg) are separately added into the pretreated crab digestion solution, to obtain solutions to be detected. The fluorescent test paper prepared in Example 1 is immersed into each of the solutions to be detected for 10 min before taking it out, and then placed on a clean glass plate for natural air drying, to obtain the reacted test paper PP corresponding to the respective solution to be detected.

Step 3.2: Check of the fluorescence detection environment: The reacted test paper PP is placed under a light source with a wavelength of 365 nm to observe with eyes the color $C_{\_CQDs'}$ corresponding to the carbon quantum dots distribution area 3; and if the $C_{\_CQDs'}$ differs from the color in the reference channel-related excited color printing area 7 of the standard colorimetric card, the luminous intensity of the light source is checked and the distance between the reacted test paper PP and the light source is adjusted to make the color $C_{\_CQDs'}$ identical to the excited color corresponding to the reference channel in the standard colorimetric card.

Step 3.3: Colorimetric reading of the content of mercury ions: The color signal $C_{\_CuNCs'}$ corresponding to the copper nanoclusters distribution area 4 on the reacted test paper PP in the fluorescence detection environment checked in Step 3.2 is observed with eyes, and the standard mercury ion sample-related excited color printing unit 11 in which the color is closest to the color signal $C_{\_CuNCs'}$ is found in the standard mercury ion sample-related excited color identification area 10 of the standard colorimetric card, so that the figures in the standard mercury ion sample concentration printing unit 9 above the standard mercury ion sample-related excited color printing unit 11 indicate the concentration of mercury ions in the crab. The detection results on the mercury ions in the crab by using a national standard method of ICP-MS, a dual-channel fluorescent test paper method, and a single-channel fluorescent test paper method are shown in Table 1. It can be seen from Table 1 that, compared with the detection results corresponding to the single-channel fluorescent test paper, the detection results corresponding to the dual-channel fluorescent test paper are closer to the detection results of the national standard method. The above detection results indicate that, the reference channel of the test paper in the present invention can be used to effectively check parameters of the fluorescence detection environment, and thus the detection accuracy of the mercury ions can be improved.

TABLE 1

Comparison of detection results about $Hg^{2+}$ (mg/kg) in crab corresponding to different detection methods

| Sample No. | ICP-MS detection results | Dual-channel fluorescent test paper* | Single-channel fluorescent test paper** |
|---|---|---|---|
| 1 | 0.34 | 0.3 | 0.4 |
| 2 | 0.52 | 0.5 | 0.5 |
| 3 | 0.83 | 0.8 | 0.9 |

*fluorescent test paper for mercury ions based on copper nanoclusters-carbon quantum dots according to the present invention
**fluorescent test paper for mercury ions that only contains copper nanoclusters

What is claimed is:

1. A fluorescent test paper for detecting mercury ions, comprising: a fluorescence development area and a standard fluorescent colorimetric card, the fluorescence development area comprises a carbon quantum dots distribution area and a copper nanoclusters distribution area, wherein carbon quantum dots fluorescent probes are distributed in the carbon quantum dots distribution area, and copper nanoclusters fluorescent probes for detecting a concentration of the mercury ions are distributed in the copper nanoclusters distribution area, wherein the standard fluorescent colorimetric card comprises a reference channel area, wherein the fluorescent test paper further comprises a test paper handheld area, wherein the test paper handheld area, the carbon quantum dots distribution area, and the copper nanoclusters distribution area are separated by a T-shaped boundary line, wherein the reference channel area comprises a reference channel excitation wavelength printing area and a reference channel excited color printing area, wherein the standard fluorescent colorimetric card further comprises a standard mercury ion sample concentration area, the standard mercury ion sample concentration area comprises a standard mercury ion sample concentration identification area, a standard mercury ion sample excited color identification area, and a standard mercury ion concentration unit identification area, wherein the standard mercury ion sample concentration identification area comprises a plurality of standard mercury ion sample concentration printing units, wherein the standard mercury ion sample excited color identification area comprises a plurality of standard mercury ion sample excited color printing units, wherein the reference channel excited color printing area comprises a standard color corresponding to the carbon quantum dots distribution area, wherein the standard color and the plurality of standard mercury ion sample excited color printing units are respectively obtained by illuminating the carbon quantum dots distribution area and the copper nanoclusters distribution area after being reacted with standard $Hg^{2+}$ samples at a specific excitation wavelength.

2. The fluorescent test paper for detecting mercury ions according to claim 1, wherein the carbon quantum dots distribution area and the copper nanoclusters distribution area are at an area ratio of 1:1.

3. The fluorescent test paper for detecting mercury ions according to claim 1, wherein the fluorescent test paper comprises a plurality of the development areas.

\* \* \* \* \*